J. B. PRICE.
POLYPHASE INDUCTION MOTOR.
APPLICATION FILED NOV. 7, 1918.
1,362,959.  Patented Dec. 21, 1920.
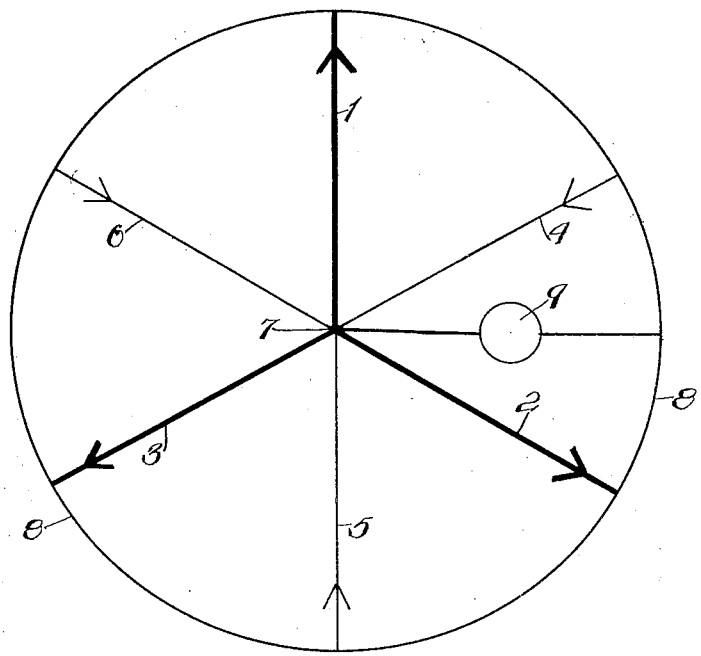
Inventor
John B. Price
By C. W. Parker
Attorney

UNITED STATES PATENT OFFICE.

JOHN B. PRICE, OF FORT THOMAS, KENTUCKY.

POLYPHASE INDUCTION-MOTOR.

1,362,959.   Specification of Letters Patent.   Patented Dec. 21, 1920.

Application filed November 7, 1918. Serial No. 261,455.

*To all whom it may concern:*

Be it known that I, JOHN B. PRICE, a citizen of the United States, residing at Fort Thomas, in the county of Campbell and State of Kentucky, have invented certain new and useful Improvements in Polyphase Induction-Motors, of which the following is a specification.

My invention relates to improvements in polyphase induction motors.

An important object of the invention is to provide a motor of the above mentioned character, having a high starting torque and a low starting current.

A further object of the invention is to provide a motor of the above mentioned character, having no slip rings or other external control, excepting a single throw primary switch.

Other objects and advantages of the invention will be apparent during the course of the following description.

In the accompanying drawings, forming a part of this specification,

The figure is a diagrammatic view, showin the phase windings of the secondary of a polyphase motor, embodying my invention.

In the drawings wherein is shown for the purpose of illustration a preferred embodiment of my invention, numerals 1, 2 and 3 designate phase windings of relatively low resistance and 4, 5 and 6 phase windings of relatively high resistance.

The secondary winding, as shown, is carried out as a star connected six-phase winding, in which alternate windings are of high resistance.

The end terminals of the phases are star connected at each end, as shown at 7 and 8, resulting in a polyhpase winding short circuited upon itself.

A circuit closing device 9, such as a centrifugal switch, (when the secondary is the rotating member) is connected to the star connections 7 and 8.

The switch is open when the motor is started but closes when the motor attains a certain predetermined speed.

The resistance of the phases 4, 5 and 6 is so proportioned as to limit the flow of current generated in phases 1, 2 and 3 at the time of starting, the complete winding being such as to produce a high resistance type secondary having high starting torque and limiting the flow of primary starting current.

When the motor attains a certain speed and the switch 9 is closed short circuiting upon itself, each and all of the phase windings of both high and low resistance, maximum current will flow in the low resistance windings 1, 2 and 3 and a torque producing current will also flow through the high resistance windings 4, 5 and 6, resulting in a secondary of low resistance characteristics producing powerful running torque.

It is to be understood that the form of my invention herein shown and described is to be taken as preferred example of the same and that various changes in the shape, size, number and arrangement of parts may be resorted to, without departing from the spirit of my invention or the scope of the subjoined claims.

Having thus described my invention, I claim:

1. A polyphase induction motor including a secondary having adjacent, dephased high and low resistance phase windings which are star connected with each other at each end, and means to connect the star connections and thereby short circuit each phase winding upon itself when the speed of the motor reaches a predetermined point.

2. A polyphase induction motor including a secondary having a plurality of dephased high and low resistance phases connected at their ends, and means to short circuit each high and low resistance phase upon itself.

3. A polyphase induction motor including a secondary having a plurality of high and low resistance phase windings which are alternately spaced and star connected at each end, and a short circuiting device to connect the two star connections.

4. A polyphase induction motor including a polyphase secondary having alternate phase windings of relatively high and low resistance, the phase windings of high resistance being so proportioned as to limit the flow of current in the low resistance phase windings when the motor is started thereby producing a secondary of high resistance, these windings being star connected at both ends, and means responsive to the speed of the motor for short circuiting the two star connections when the motor attains a predetermined speed for allowing the maximum current to flow in the low resistance phase windings and thereby producing a rotor having low resistance characteristics.

In testimony whereof I affix my signature in presence of two witnesses.

JOHN B. PRICE.

Witnesses:
T. F. COSTELLO,
PHILIP MOESSINGER.